(12) United States Patent
Koutaki

(10) Patent No.: US 8,379,942 B2
(45) Date of Patent: Feb. 19, 2013

(54) IMAGING DEVICE, RECORDING MEDIUM HAVING RECORDED THEREIN IMAGING CONTROL PROGRAM, AND IMAGING CONTROL METHOD

(75) Inventor: Kayo Koutaki, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/302,582

(22) Filed: Nov. 22, 2011

(65) Prior Publication Data

US 2012/0062765 A1   Mar. 15, 2012

Related U.S. Application Data

(62) Division of application No. 12/150,535, filed on Apr. 29, 2008.

(30) Foreign Application Priority Data

May 2, 2007   (JP) .................................. 2007-121494

(51) Int. Cl.
*G06K 9/00* (2006.01)
(52) U.S. Cl. ...................... 382/118; 340/5.53; 340/5.83
(58) Field of Classification Search .................. 382/118; 340/5.53, 5.83
See application file for complete search history.

(56) References Cited

U.S. PATENT DOCUMENTS

| | | | |
|---|---|---|---|
| 6,501,856 B2 * | 12/2002 | Kuwano et al. ................ | 382/194 |
| 6,522,830 B2 * | 2/2003 | Yamagami ..................... | 386/240 |
| 6,636,635 B2 * | 10/2003 | Matsugu ........................ | 382/218 |
| 7,366,404 B2 * | 4/2008 | Yamagami ..................... | 386/248 |
| 7,733,385 B2 * | 6/2010 | Watanabe et al. ........... | 348/231.2 |
| 7,783,135 B2 * | 8/2010 | Gokturk et al. ................ | 382/305 |
| 2002/0044691 A1 * | 4/2002 | Matsugu ........................ | 382/218 |
| 2002/0093670 A1 * | 7/2002 | Luo et al. ........................ | 358/1.9 |
| 2003/0052986 A1 * | 3/2003 | Matsumoto ............. | 348/333.05 |
| 2003/0071908 A1 * | 4/2003 | Sannoh et al. ................ | 348/345 |
| 2004/0208114 A1 * | 10/2004 | Lao et al. ....................... | 369/125 |
| 2007/0025627 A1 * | 2/2007 | Hasegawa et al. ........... | 382/239 |
| 2008/0285791 A1 * | 11/2008 | Suzuki et al. ................. | 382/100 |

FOREIGN PATENT DOCUMENTS

| | | |
|---|---|---|
| EP | 1 441 497 A2 | 7/2004 |
| JP | 2002-044489 A | 2/2002 |
| JP | 2003-092701 A | 3/2003 |
| JP | 2003-150932 A | 5/2003 |
| JP | 2005-086516 A | 3/2005 |
| JP | 2006-087083 A | 3/2006 |
| JP | 2006-166408 A | 6/2006 |

OTHER PUBLICATIONS

Japanese Office Action dated Feb. 24, 2009, issued in counterpart Japanese Application Japanese No. 2007-121494, and English translation thereof.
Chinese Office Action dated Jul. 26, 2010, issued in counterpart Chinese Application No. 200810214747.1, and English translation thereof.
Extended European Search Report (EESR) dated May 29, 2012 (in English) in counterpart European Application No. 08008192.0.

* cited by examiner

*Primary Examiner* — John Strege
(74) *Attorney, Agent, or Firm* — Holtz, Holtz, Goodman & Chick, PC

(57) ABSTRACT

When a shutter key is operated, characteristic data is acquired. A determination is made as to whether the characteristic data has been acquired, and face image shooting processing is executed when the characteristic data has been acquired. File generation processing is executed in which a format of a face registration file is generated and the characteristic data and image data are written into the format of this face registration file, thereby generating a single face registration file.

25 Claims, 9 Drawing Sheets

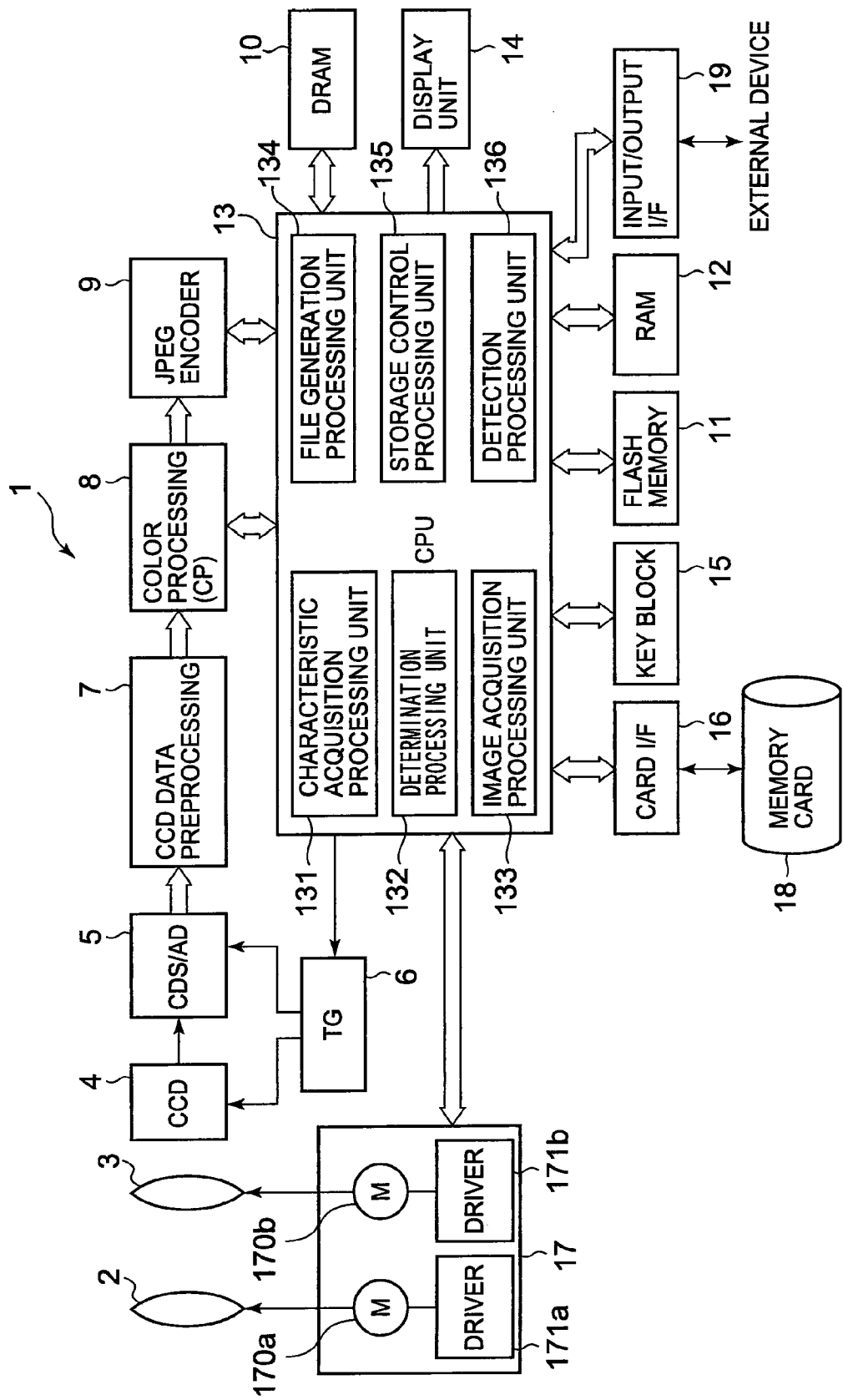

FIG. 2A

| SEGMENT | MARKER CODE | DETAILS OF SEGMENT | REMARKS |
|---|---|---|---|
| SOI | FFD8h | (START OF IMAGE) | |
| APP2 | FFE2h | USER SETTING INFORMATION | — 201 |
| APP3 | FFE3h | USER DICTIONARY DATA (CHARACTERISTIC DATA) | — 202 |
| DQT | FFDBh | Y QUANTIZATION TABLE · C QUANTIZATION TABLE | |
| DHT | FFC4h | STANDARD HUFFMAN TABLE | 203 |
| DRI | FFDDh | RESTART INTERVAL | |
| SOF | FFC0h | FRAME HEADER | |
| SOS | FFDAh | SCAN HEADER | |
| | | CODE DATA | |
| EOI | FFD9h | (END OF IMAGE) | |

| FIELD NAME | SIZE |
|---|---|
| APP2 (FFE2h) | 2 Byte |
| LENGTH | 2 |
| MODEL | 12 |
| PRIORITY | 12 |
| RELATION | 12 |

FIG. 2C

| FIELD NAME | SIZE |
|---|---|
| APP3 (FFE3h) | 2 Byte |
| LENGTH | 2 |
| BODY (USER DICTIONARY DATA) | (DEPENDENT ON ENGINE) |

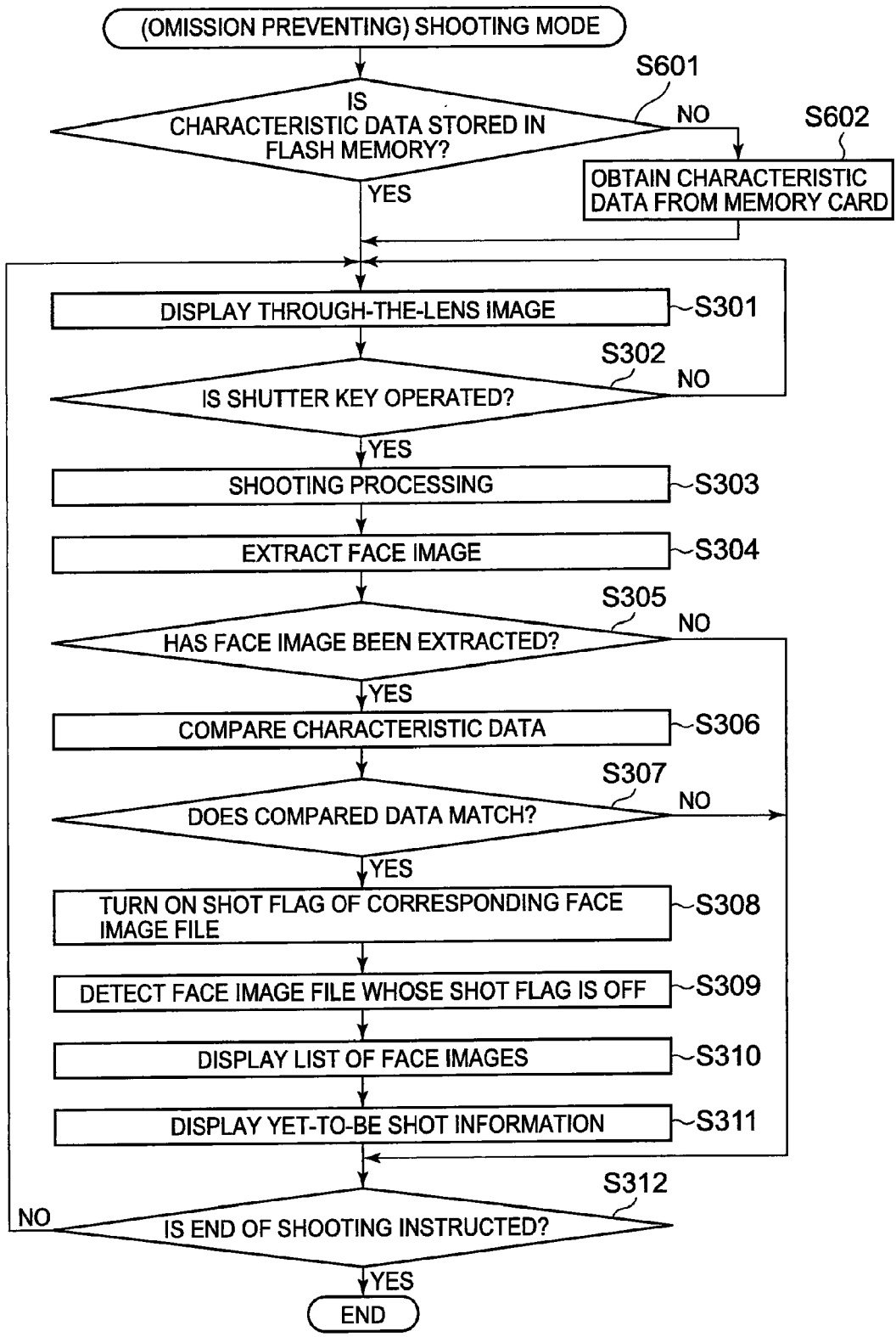

IMAGING DEVICE, RECORDING MEDIUM HAVING RECORDED THEREIN IMAGING CONTROL PROGRAM, AND IMAGING CONTROL METHOD

CROSS REFERENCE TO RELATED APPLICATIONS

This is a Divisional Application of U.S. application Ser. No. 12/150,535, filed Apr. 29, 2008, which application is based upon and claims the benefit of priority from Japanese Patent Application No. TOKUGAN 2007-121494, filed May 2, 2007, the entire contents of both of which are incorporated herein by reference.

BACKGROUND OF THE INVENTION

1. Field of the Invention

The present invention relates to an imaging device with a function of acquiring characteristic information of an image, and also to an imaging control program and an imaging control method used for the imaging device.

2. Description of the Related Art

An imaging device with a function of acquiring characteristic information of an image has been known, as disclosed in Japanese Patent Application Laid-open No. 2005-86516. This imaging device performs shooting processing in response to a shutter key operation, and acquires an image. Next, the imaging device detects a face contained in the shot image using a face recognizing unit, then generates, based on the detected face, characteristic information for identifying a person of the face, adds the generated characteristic information to the image, and finally has the resultant image stored. This enables identification of the person contained in this image based on the characteristic information, without displaying the image.

SUMMARY OF THE INVENTION

An object of the present invention is to acquire characteristic information of an image without performing wasteful image acquiring processing.

An aspect of the present invention provides an imaging device including an imaging unit that captures an image successively, a characteristic acquiring unit that acquires characteristic information of the image captured by the imaging unit, a determination unit that determines whether the characteristic information has been acquired by the characteristic acquiring unit, and an image acquiring unit that acquires the image captured by the imaging unit on condition that the determination unit determines that the characteristic information has been acquired.

Another aspect of the present invention provides a recording medium having recorded therein a program causing a computer to execute processing, the computer being provided in an imaging device having therein an imaging unit that captures an image successively, the processing including a first process for acquiring characteristic information of an image captured by the imaging unit, a second process for determining whether the characteristic information has been acquired in the first process; and a third process for acquiring the image captured by the imaging unit on condition that the characteristic information is determined to have been acquired in the second process.

A still another aspect of the present invention provides an imaging control method for an imaging device having therein an imaging unit that captures an image successively, the method including a characteristic acquiring step of acquiring characteristic information of the image captured by the imaging unit, a determining step of determining whether the characteristic information has been acquired at the characteristic acquiring step, and an image acquiring step of acquiring the image captured by the imaging unit on condition that the characteristic information is determined to have been acquired at the determining step.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1 is a block diagram of a digital camera that is common to each embodiment of the present invention;

FIG. 2A shows a file structure of a face registration file;

FIG. 2B shows details of user setting information;

FIG. 2C shows details of user dictionary data;

FIG. 6 is a flowchart showing a process procedure in a shooting mode according to the first embodiment;

DETAILED DESCRIPTION OF THE PREFERRED EMBODIMENTS

Figure 3:
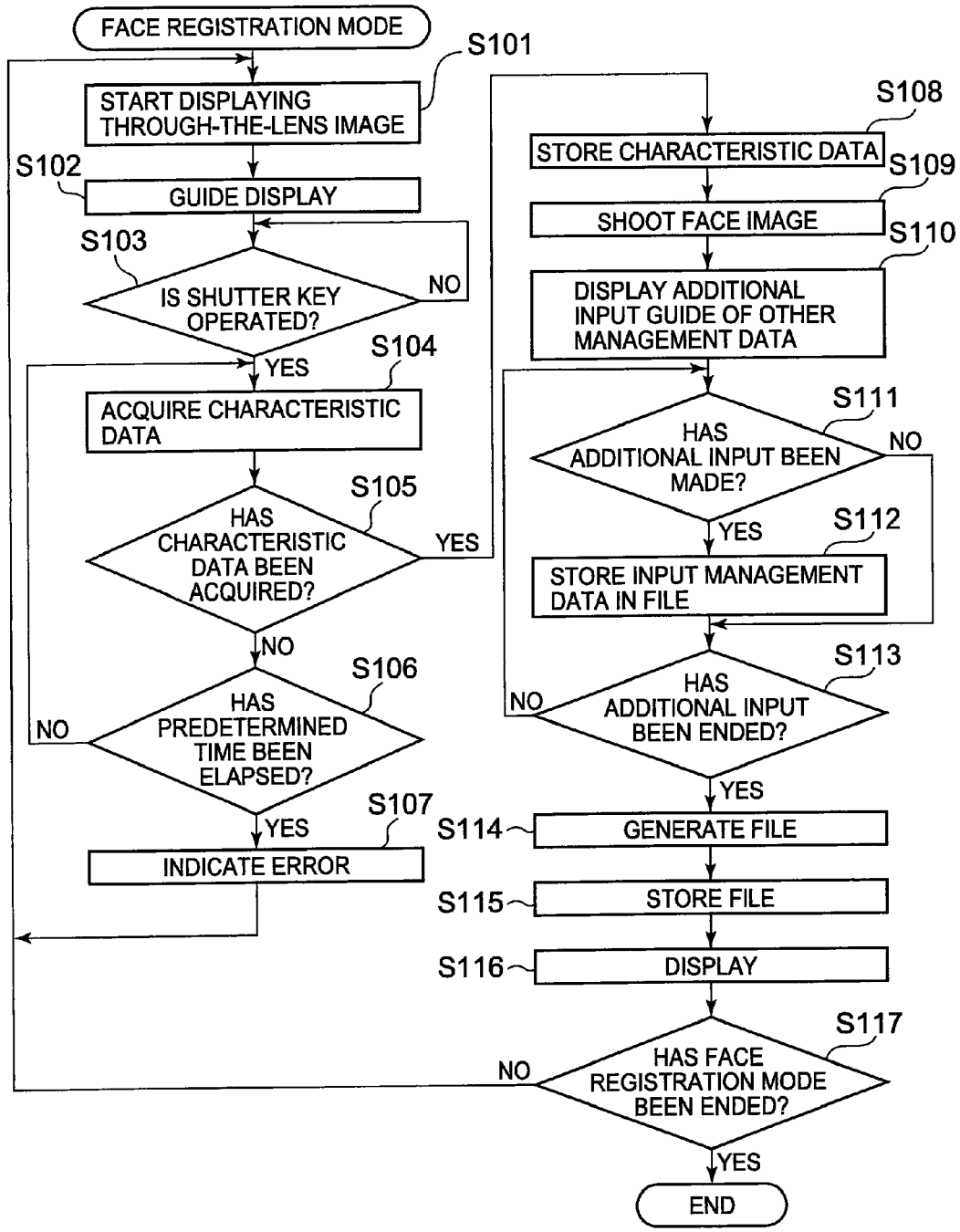
FIG. 3 is a flowchart showing a process procedure in a face registration mode according to a first embodiment of the present invention.

Preferred embodiments of the present invention will be explained below with reference to the drawings.

First Embodiment

FIG. 1 is a block diagram of a digital camera 1 that is common to each embodiment of the present invention. The digital camera 1 has an AF function (Auto-Focus function), and includes a focus lens 2, a zoom lens 3, a CCD 4, a CDS/AD block 5, a TG (Timing Generator) 6, a CCD data preprocessing block 7, a color processing (CP) block 8, a JPEG encoder 9, a DRAM 10, a built-in flash memory 11, a RAM 12, a CPU 13, a display unit 14, a key block 15, a card interface (I/F) 16, a motor driver block 17, and an input/output I/F 19. To the card I/F 16, a memory card 18 is connected, which is removably inserted into a card slot (not shown) provided in a main unit of the camera. To the input/output I/F 19, an external device such as another digital camera and a personal computer is connected.

The focus lens 2 and the zoom lens 3 each are composed of a group of lenses (not shown). The motor driver block 17 is composed of a focus motor 170a that drives the focus lens 2 in an optical axis direction thereof, a zoom motor 170b that drives the zoom lens 3 in an optical axis direction thereof, and motor drivers 171a and 171b that drive the focus motor 170a and the zoom motor 170b, respectively, according to a control signal sent from the CPU 13. Note that the focus motor 170a and the zoom motor 170b are stepping motors.

The CCD 4 converts an optical object image projected through the focus lens 2 and the zoom lens 3 into electrical signals, and outputs the converted signals as imaging signals. The TG 6 generates a timing signal at a predetermined frequency to drive the CCD 4. The CDS/AD block 5 samples the output signal of the CCD 4, removes noise from the sampled signal, and converts it to a digital signal. The CCD data preprocessing block 7 performs data processing, such as brightness signal processing, for the imaging signal converted to the digital signal. The color processing (CP) block 8 performs color processing, such as color separation, for the image signal subjected to the brightness signal processing and the like, and then generates image data of Y, Cb, and Cr. The DRAM 10 sequentially stores the image data of Y, Cb, and Cr obtained after the color processing.

The display unit 14 is made up of a color LCD, a driving circuit for driving the color LCD, and the like. When the camera is in a shooting standby state in which a shutter key is not being pressed in a shooting mode, the display unit 14 displays a through-the-lens images based on one-frame (screen) image data that is captured by the CCD 4 and accumulated in the DRAM 10, and when the camera is in a play-back mode, the display unit 14 displays recorded images based on image data that is read from the memory card 18 and expanded.

The JPEG encoder 9 compresses using JPEG, image data input from the color processing (CP) block 8 at image recording (shooting processing). The memory card 18 records therein the compressed image data sent via the card I/F 16. The recorded image data is read during playback of a recorded image, expanded by the JPEG encoder 9, and then displayed on the display unit 14. The key block 15 has various operation keys including a switch key intended to switch various modes such as the shooting mode, the playback mode, and a face image registration mode, a SET key, the shutter key, a setting key intended to set an iris and shutter speed, and a zoom key intended to change zoom magnification, and sends an operation signal corresponding to a key operation to the CPU 13. The shutter key has the so-called a half-shutter function, which enables a half-pressing operation for advance notice of shooting and a full-pressing operation for a shooting command.

The flash memory 11 stores therein programs and various data necessary for the CPU 13 to control the digital camera 1, that is, those necessary to make AF control, AE control, AWB control, and the like, as well as control programs for executing controls indicated by flowcharts which will be described later. The CPU 13 runs according to the operation signal fed from the key block 15 and the programs described above by using the RAM 12 as a working memory. The CPU 13 has a characteristic acquisition processing unit 131, a determination processing unit 132, an image acquisition processing unit 133, a file generation processing unit 134, a storage control processing unit 135, and a detection processing unit 136.

FIG. 2A shows a file structure of a face registration file 20 generated by a process performed according to a flowchart described later. This face registration file 20 has fill-out fields of "marker code", "details of segment", and "remarks" provided for each "segment". User setting information 201 of a segment "APP2" (marker code; FFE2h) is, as shown in FIG. 2B, composed of "Length", "Model", "Priority", and "Relation". The "Priority" indicates priority at the time of shooting, and the "Relation" indicates the names of family members, such as mother and father.

User dictionary data 202 of a segment "APP3" (marker code; FFE3h) is, as shown in FIG. 2C, composed of "Length" and "Body (user dictionary data)". The "Length" indicates data length of the user dictionary data, and the "Body (user dictionary data)" is characteristic data indicating characteristics of a face image acquired as described later.

Referring back to FIG. 2A, segments "DQT" to "SOS" (marker codes; FFDBh to FFD9h) are face image data 203 shot as described later. That is, one piece of the face image data 203 is composed of various kinds of information, such as Y and C quantization tables, a standard Huffman table, a restart interval, a frame header, and a scan header.

Therefore, at the time of shooting, the face registration file 20 is so created as to contain the user setting information 201 that indicates the priority and the names of family members (mother, farther, etc.) who are user of the digital camera 1, the user dictionary data 202 that is the characteristic data of the face images of the users (persons registered), and the face image data 203 of the users. Accordingly, these displayable user setting information 201 and face image data 203 are designed to serve as management information for managing the face registration file 20.

Next, thus configured operations of the digital camera 1 according to the present invention will be described. When the camera 1 is powered on and thereafter the face registration mode is set by operating the mode switch key provided in the key block 15, the CPU 13 runs according to the aforementioned programs and executes a process as shown by a flowchart of FIG. 3. Specifically, based on one-frame (screen) image data captured by the CCD 4 and accumulated successively in the DRAM 10, the CPU 13 starts displaying a through-the-lens image (step S101). Therefore, when a person shooting the image turns the digital camera 1 upon a person's face to be registered, a face image of this person is displayed on the display unit 14 at a predetermined frame rate.

Figure 4:
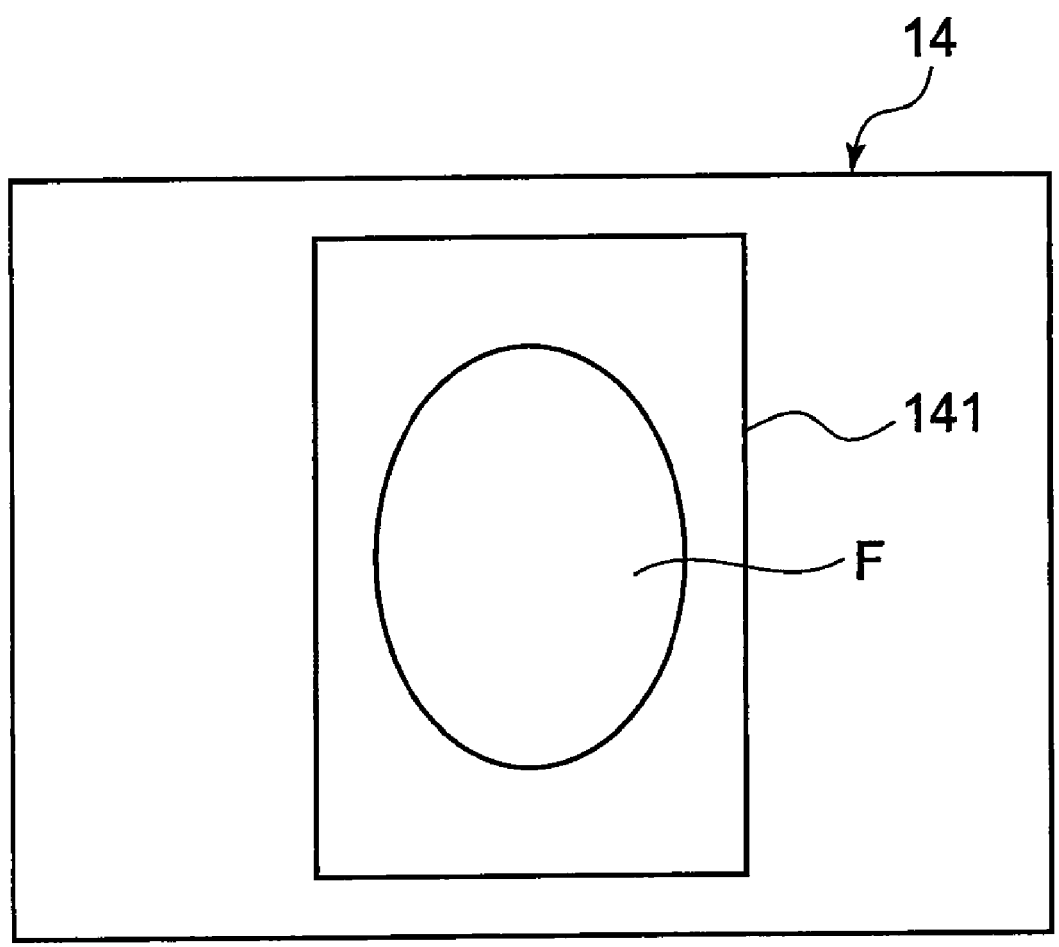
FIG. 4 is a display example of guide display.

Next, guide display processing is executed to display a guide frame on the display unit 14 (step S102). By the processing at step S102, a vertically-long rectangle guide frame 141 is displayed substantially at the center of the display unit 14, as shown in FIG. 4. This leads the person shooting the image to adjust orientation and the like of the digital camera 1 so as to fit a face image F of the person to be registered into the guide frame 141. After the digital camera 1 is adjusted to fit the face image F into the guide frame 141 as shown in FIG. 4, the shutter key is operated, whereupon a determination at step S103 results in YES.

The process then proceeds from step S103 to step S104, at which the characteristic acquisition processing unit 131 acquires the characteristic data. In this acquisition of the characteristic data, predetermined brightness information, luminance distribution information, and the like, are extracted as the characteristic data from the image data of the one-frame (screen) face image captured successively by the CCD 4. Of course, iris data, which is luminance distribution information of the pupil in the face image, can be acquired as the characteristic data by using a widely known iris data acquisition technique or recognition technique.

Next, the determination processing unit 132 determines whether the characteristic data has been acquired at step S104 (step S105). When the characteristic data has not been acquired, a determination is made as to whether a predetermined time has passed (step S106), and when the predetermined time has not passed, step S104 and its subsequent steps are repeated. When the predetermined time has passed without acquiring the characteristic data while step S104 and its subsequent steps are repeated, a determination at step S106 results in YES. In this case, an error indication is made on the display unit 14 (step S107), and the process returns to step S101.

A user who saw this error indication can recognize that the digital camera 1 is in a shooting environment in which the characteristic data cannot be acquired, for example, in a dark shooting environment. When the person shooting the image improves the shooting environment and thereby the characteristic data is successfully acquired, the determination at step S105 results in YES. Therefore, the process proceeds from step S105 to S108, at which the acquired characteristic data is stored temporarily in the DRAM 10. Next, the image acquisition processing unit 133 executes face image shooting processing, and stores image data of the face image F within the guide frame 141 into the DRAM 10 (step S109).

Subsequently, an additional input guide of other management data is executed to display the additional input guide, such as "Do you input other management data except for face image?", on the display unit 14 (step S110). When the person shooting the image who saw this additional input guide inputs the priority at the time of shooting or the names of family members such as mother and father by operating the key block 15, a determination at step S111 results in YES. The process then proceeds from step S111 to step S112, at which the management data input additionally is stored temporarily in the DRAM 10 as the user setting information 201 (step S112).

Furthermore, a determination is made as to whether the end of additional input is instructed through an operation to the key block 15 (step S113), and when the operation is made to end the additional input, the process proceeds from step S113 to S114, at which the file generation processing unit 134 executes file generation processing. In this file generation processing, a format of the face registration file 20 shown in FIG. 2A is generated in the DRAM 10. In this format of the face registration file 20, the characteristic data stored temporarily in the DRAM 10 and the image data of the face image F stored in the DRAM 10 are written as the user dictionary data 202 and the face image data 203, respectively, and also the user setting information 201 is written. By this processing, the face registration file 20 shown in FIG. 2A is generated in the DRAM 10.

Subsequently, file recording processing is executed to record, onto the flash memory 11, the face registration file 20 generated within the DRAM 10 (step S115). Furthermore, display processing is executed to read the user setting information 201 and the face image data 203 from the face registration file 20 recorded onto the flash memory 11 and display them on the display unit 14 (step S116). Accordingly, by viewing the user setting information 201 and the face image data 203, the person shooting the image can recognize the face image of the person (user) for which the characteristic data has been registered this time, and the user setting information of this person.

Next, a determination is made as to whether the end of the face registration mode being currently set is instructed through an operation to the key block 15 (step S117). Step S101 and its subsequent steps are repeated until the operation for ending the face registration mode is made, and when it is made, the process according to this flowchart is terminated.

Accordingly, every time step S101 and its subsequent steps are repeated, the face registration file 20, which contains the user dictionary data 202 that is the characteristic data in the face image and also contains the management information composed of the user setting information 201 and the face image data 203, can be generated for each person, and then the generated face registration file 20 can be recorded onto the flash memory 11.

Furthermore, according to the first embodiment, the face image shooting processing is executed (step S109) on condition that the characteristic data of the face image has been acquired (step S105), which is a different procedure from a conventional one in which the characteristic data is acquired from a shot face image. In the conventional procedure in which the characteristic data is acquired from a shot face image, a shooting operation results in the waste of time when the characteristic data cannot be acquired from the shot face image. According to the procedure of the first embodiment, however, the face image shooting processing is executed on condition that the characteristic data of the face image has been acquired (step S105), and therefore, one time of the face image shooting processing is enough, which thereby avoids another wasteful shooting processing for the face image.

Moreover, the user dictionary data 202 that is the characteristic data in the face image, and the management information composed of the user setting information 201 and the face image data 203, are recorded in a single file (face registration file 20). This makes it possible to handle the characteristic data and the management data always inseparably, so that information consistency therebetween can be maintained.

Although the face registration file 20 is recorded onto the flash memory 11 in the first embodiment, the face registration file 20 can be recorded onto the memory card 18 or another memory which is provided in a fixed manner and dedicated to the face registration file 20. The memory card 18 is removably inserted into the card slot of the main unit of the camera. Therefore, when the face registration file 20 is recorded onto the memory card 18, the memory card 18 can be removed from this camera and inserted to another digital camera. Advantageously, this means that the other digital camera also can make the shooting processing using the face registration file 20, as will be described later.

Figure 5:
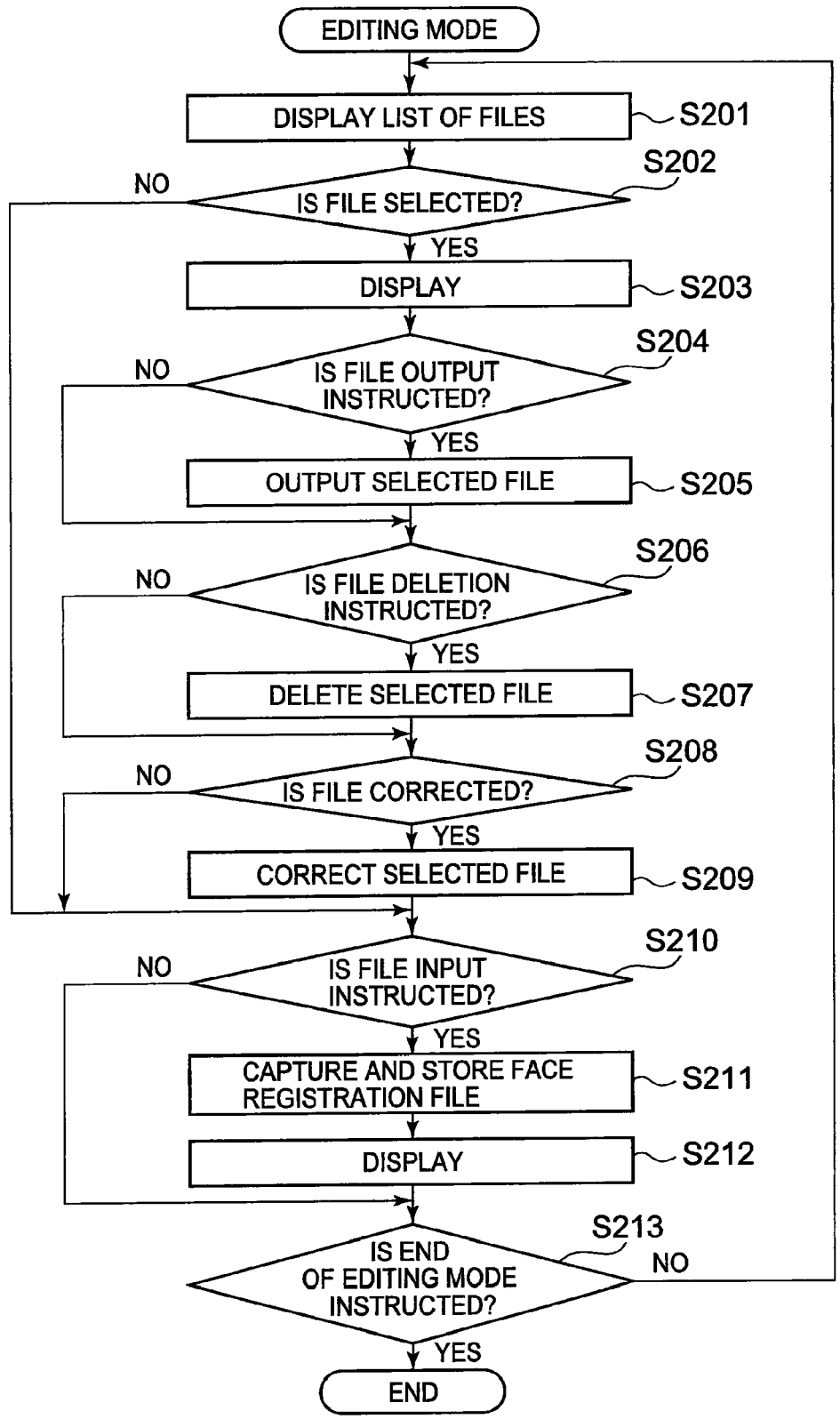
FIG. 5 is a flowchart showing a process procedure in an editing mode according to the first embodiment.

FIG. 5 is a flowchart showing a process procedure in the editing mode. When the editing mode is set through an operation to the mode switch key provided in the key block 15, the CPU runs according to the aforementioned programs and executes a process as shown by this flowchart. More specifically, a list of images in the face registration files 20 recorded onto the memory card 18 is generated and displayed on the display unit 14 (step S201). Next, a determination is made as to whether any of the files displayed on the display unit 14 is selected from the list (step S202). When no file is selected, the process proceeds to step S210 described later, and when a file is selected, the display processing is executed (step S203).

This display processing is the same as that executed at step S116 described above, by which the user setting information 201 and the face image data 203 are read from the selected face registration file 20 recorded onto the memory card 18, and then displayed on the display unit 14. By viewing this, an editor can see the face image and the user setting information of a person recorded in the selected face registration file 20, which enables the editor to visually recognize the selected face registration file 20.

Next, a determination is made as to whether output (migration) is instructed through an operation to the key block 15 (step S204), and when output (migration) is instructed, the selected face registration file 20 is output to an external device via the input/output I/F 19 (step S205). Therefore, by connecting the input/output I/F 19 to an external device such as another digital camera and microcomputer, the face registration file 20 generated and recorded in the digital camera 1 can be provided in the external device. Note that the face registration file 20 output externally this time can be deleted (migrated) from the memory card 18 of the digital camera 1 or can remain therein.

Subsequently, a determination is made as to whether deletion is instructed through an operation to the key block 15 (step S206), and when deletion is instructed, the selected face registration file 20 is deleted from the memory card 18 (step S207). Furthermore, a determination is made as to whether an operation for correction is made (step S208), and when the operation for correction is made, the user setting information 201 of the selected face registration file 20 is corrected based on data input through the key block 15 (step S209).

Accordingly, the user setting information 201 can be added, deleted, and corrected in this editing mode as well as in the face registration mode described above. Therefore, even when there is no input of the user setting information 201 in the face registration mode, the user setting information 201 can be input in this editing mode. There is, therefore, sufficient time to input the user setting information after the end of the face registration mode which involves shooting operations.

Furthermore, a determination is made as to whether input (read) is instructed through an operation to the key block 15 (step S210). When input (read) is instructed, the storage control processing unit 135 captures the face registration file 20 that is transmitted from an external device such as another digital camera and microcomputer connected in advance to the input/output I/F 19, and records it onto the memory card 18 (step S211). Accordingly, the face registration file 20 generated in the external device can be used in the digital camera 1.

Subsequently, the display processing is executed (step S212). This display processing is the same as that executed at step S116 described above, by which the user setting information 201 and the face image data 203 are read from the face registration file 20 recorded this time onto the memory card 18, and displayed on the display unit 14. Accordingly, the editor can view the face image and the user setting information of a person who is recorded in the face registration file recorded this time onto the memory card 18.

The face registration file 20 recorded this time onto the memory card 18 has not been generated in the digital camera 1 but provided by the external device. Accordingly, by viewing the displayed user setting information 201 and face image data 203, the editor can visually recognize the contents of the provided face registration file 20.

Subsequently, a determination is made as to whether the end of the editing mode being set currently is instructed through an operation to the key block 15 (step S213). Step S201 and its subsequent steps are repeated until the operation for ending the editing mode is made, and when it is made, the process according to this flowchart is terminated.

The face registration file 20 that is output (migrated), deleted, corrected, or input (read) in this editing mode is, as described above, recorded as a single file (face registration file 20) that contains the user dictionary data 202 that is the characteristic data in the face image, and also contains the management information composed of the user setting information 201 and the face image data 203. Accordingly, the output (migration), deletion, correction and input (read) can be made in units of the face registration file 20 in which the characteristic data and the management information thereof are related inseparably to each other, so that information consistency can be maintained even when the output (migration), deletion, correction, and input (read) are made.

When an omission preventing mode or a normal mode is set as a shooting mode, the CPU 13 runs according to the aforementioned programs and executes a process as shown by a flowchart of FIG. 6. Specifically, a determination is made as to whether the face registration file 20 is stored in the flash memory 11 (step S601). When the face registration file 20 is stored in the flash memory 11, the process proceeds to step S301. When no face registration file 20 is stored in the flash memory 11, the face registration file 20 is read from the memory card 18, and is then stored in the flash memory 11 (step S602). Next, the through-the-lens image based on one-frame (screen) image data captured by the CCD4 and accumulated in the DRAM 10 is displayed on the display unit 14 (step S301). A determination is then made as to whether the shutter key is operated (step S302), and when the shutter key is operated, the shooting processing is executed (step S303), and image data compressed using JPEG is recorded onto the memory card 18.

Next, face image extraction processing is executed to extract a face image from a shot image that is the image data recorded onto the memory card 18 (step S304). Furthermore, a determination is made as to whether the face image has been extracted at step S304 (step S305). When the face image has not been extracted, the process proceeds to step S312. When the face image has been extracted, the characteristic data of the extracted face image is acquired, and it is compared to each characteristic data recorded in a plurality of the face registration files 20 stored in the flash memory 11 (step S306). As a result of this comparison, a determination is made as to whether there is a face registration file 20 having the characteristic data which matches the characteristic data of the shot face image (step S307).

When there is no face registration file 20 having the characteristic data matching that of the shot face image (step S307; NO), the process skips steps S308 to S311, and proceeds straight to step S312. When there is a face registration file 20 having the characteristic data matching that of the shot face image, a shot flag F, which is provided in the flash memory 11 for each face registration file 20 and corresponds to the face registration file 20 determined to have the matching characteristic data, is turned ON (step S308).

Subsequently, from a plurality of the face registration files 20 stored in the flash memory 11, the detection processing unit 136 detects a face registration file 20 whose shot flag F is OFF (step S309). Furthermore, the face image data 203 is read from each face registration file 20 stored in the flash memory 11, and a list of registration face images, which are face images based on this read face image data 203, is displayed (step S310). Therefore, on the display unit 14, the list of registration face images is displayed based on the face image data 203 recorded in each face registration file 20, as shown in FIGS. 7A and 7B.

Specifically, the face registration file 20 contains not only the user dictionary data 202 that is the characteristic data of the face image, but also the face image data 203 as the management information. Accordingly, by effectively utilizing this face image data 203, it is possible to display a list of face images of the face registration files 20 stored in the flash memory 11.

Figure 7A:
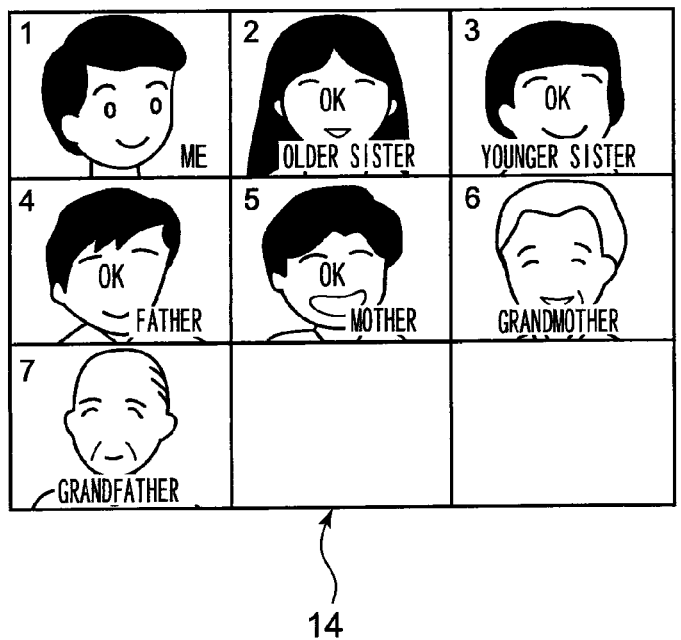
FIG. 7A is a display example in the first embodiment.
Figure 7B:
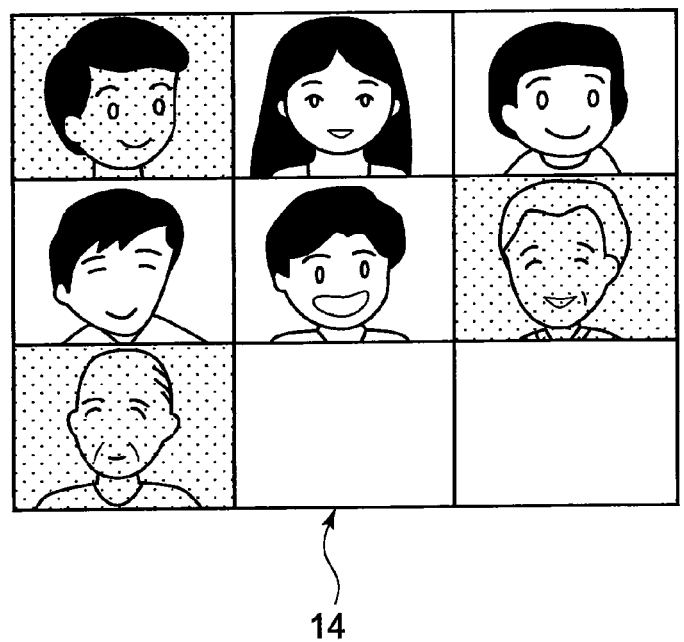
FIG. 7B is another display example in the first embodiment.

The face registration file 20 further contains the user setting information 201 as the management information, and it is therefore possible to display a list of the registration face images in order of descending priority based on "Family Priority", which is of the user setting information 201 and is indicating the priority at the time of shooting, as shown in FIGS. 7A and 7B. Furthermore, the order of priority 142 can be displayed for each registration face image, and the names of family members 143, such as "me", "older sister", and "younger sister", can also be displayed based on "Family Name" of the user setting information 201, as shown in FIG. 7A.

Afterwards, yet-to-be shot information display processing is executed (step S311). In this yet-to-be shot information display processing, for example, a registration face image corresponding to the face registration file 20 having an OFF-shot flag F detected at step S309 is displayed as it is, and on an already-shot registration face image having an ON-shot flag F, "OK" is displayed in a superimposed manner, as shown in FIG. 7A. Alternatively, a yet-to-be shot registration face image having the OFF-shot flag F is displayed as it is, and the already-shot registration face image having the ON-shot flag F is blurred.

Accordingly, according to the first embodiment, every time an image is shot which contains a face image that matches the characteristic data recorded in either of the face registration files 20 stored in the flash memory 11, the yet-to-be shot registration face image is displayed on the display unit 14. Therefore, every time a user takes an image of a person who has already been registered in the face registration file 20, the user can confirm a yet-to-be shot person ("yet-to-be-shot person" means an object which has not yet been shot, and does not mean a person to shoot an image, who has not shot it yet.) This gives a strong impression on this user of the yet-to-be shot person, and hence raises awareness of shooting this yet-to-be shot person preferentially in subsequent shooting operations, so that it becomes possible to shot an image of a person who has already been registered, without forgetting to shoot the image of the yet-to-be shot person.

At step S312 subsequent to step S311, a determination is made as to whether the end of shooting is instructed, such as whether an operation for mode switch from the shooting mode to another mode is made. Until the end of shooting is instructed, step S301 and its subsequent steps are repeated, and when the end of shooting is instructed, the process according to this flowchart is terminated.

The first embodiment has handled the case that, after the shooting processing is made and the shot image is recorded onto the memory card 18 at step S303, a determination is made as to whether there is a face registration file 20 having the characteristic data which matches the characteristic data of the shot face image at step S307. It is, however, also possible that the shot image is stored in the DRAM 10 at the time when the shutter key is operated, and is recorded onto the memory card 18 only after there is a face registration file 20 having the characteristic data matching with that of the shot face image, or deleted without being recorded onto the memory card 18 when there is no registration face image in the shot image. Therefore, only the shot image containing the registration face image can be recorded onto the memory card 18.

The first embodiment also has handled the case that, when the determination at step S307 results in NO, the process proceeds to step S312. However, the process can proceed also to step S309. In this case, when there is no face registration file 20 having the characteristic data matching with that of the shot face image, the yet-to-be shot registration face image is displayed whenever shooting is made. This can encourage the user to shoot an image of a registered person swiftly.

Furthermore, the display of the list of the face images at step S310 and the display of the yet-to-be shot information at step S311 are made immediately after the shooting processing, but can be made alternatively at another point of time, such as when the camera is powered on, when the shooting mode is set for the first time that day, and when the shutter key is operated for the first time that day. Moreover, the display of the yet-to-be shot information at step S311 is not limited to the ways of FIG. 7, and both shot and yet-to-be shot information can be displayed distinguishably in another way of displaying, or only the already-shot registration face images can be displayed.

Second Embodiment

Figure 8:
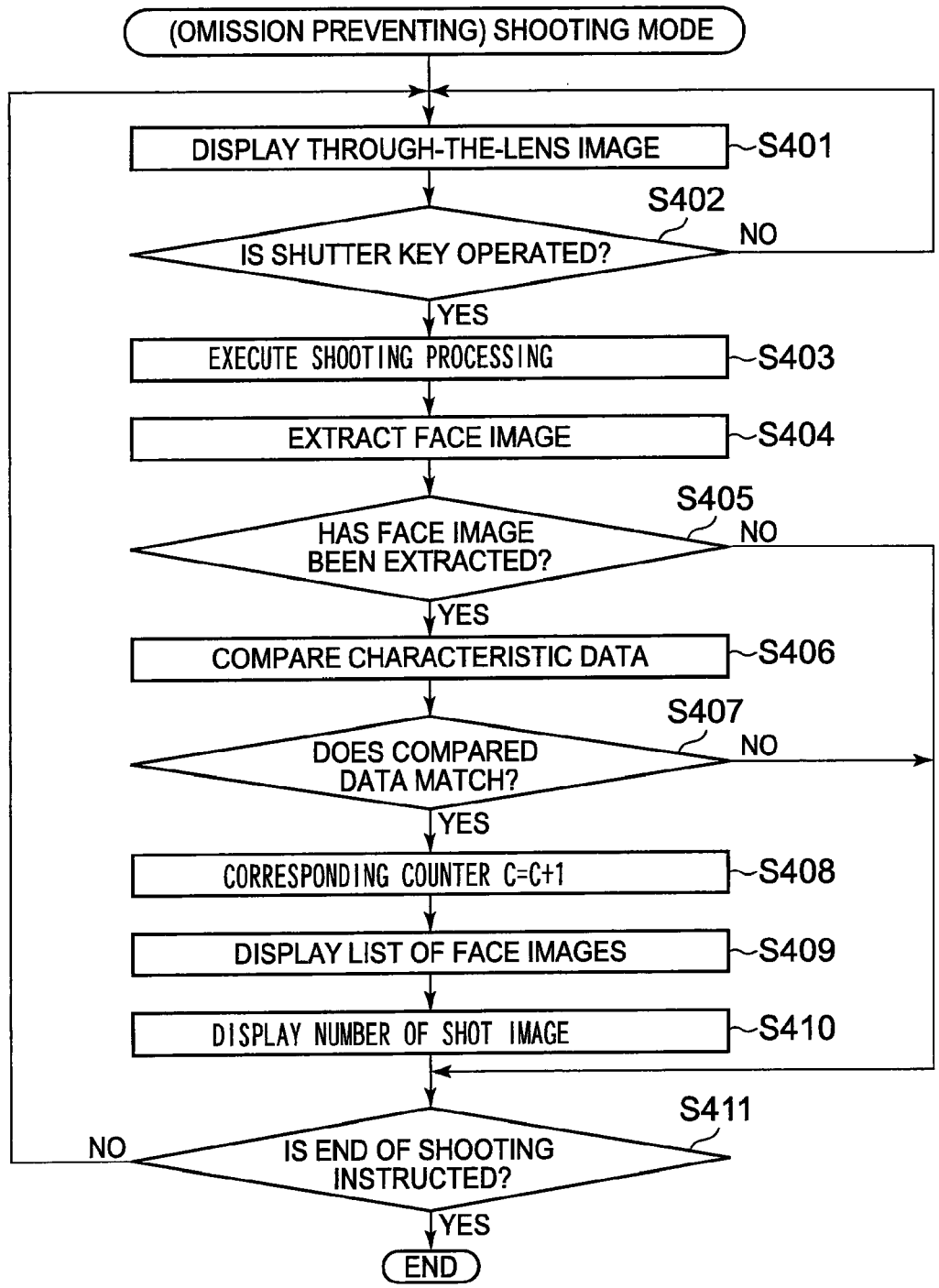
FIG. 8 is a flowchart showing a process procedure in a shooting mode according to a second embodiment of the present invention.

FIG. 8 is a flowchart showing a process procedure in a shooting mode according to a second embodiment of the present invention. When an omission preventing mode or a normal mode is set as a shooting mode, the CPU 13 runs according to the programs mentioned above, and executes a process as shown by the flowchart. More specifically, the through-the-lens image based on one-frame (screen) image data captured by the CCD 4 and accumulated in the DRAM 10 is displayed on the display unit 14 (step S401). Next, a determination is made as to whether the shutter key is operated (step S402), and when the shutter key is operated, the shooting processing is executed (step S403), and then image data compressed using JPEG is recorded onto the memory card 18.

Furthermore, the face image extraction processing is executed to extract a face image from the shot image that is the image data recorded onto the memory card 18 (step S404). A determination is made as to whether the face image has been extracted at step S404 (step S405), and when the face image has not been extracted, the process proceeds to step S411. When the face image has been extracted, the characteristic data of the extracted face image is acquired, and it is compared to each characteristic data recorded in a plurality of the face registration files 20 stored in the flash memory 11 (step S406). As a result of this comparison, the detection processing unit 136 determines whether there is a face registration file 20 having the characteristic data which matches the characteristic data of the shot face image (step S407).

When there is no face registration file 20 having the characteristic data matching that of the shot face image (step S407; NO), the process skips steps S408 to S410, and proceeds straight to step S411. When there is a face registration file 20 having the characteristic data matching that of the shot face image, a counter C, which is provided in the flash memory 11 for each face registration file 20 and corresponds to the face registration file 20 determined to have the matching characteristic data, is incremented (step S408).

Figure 9:
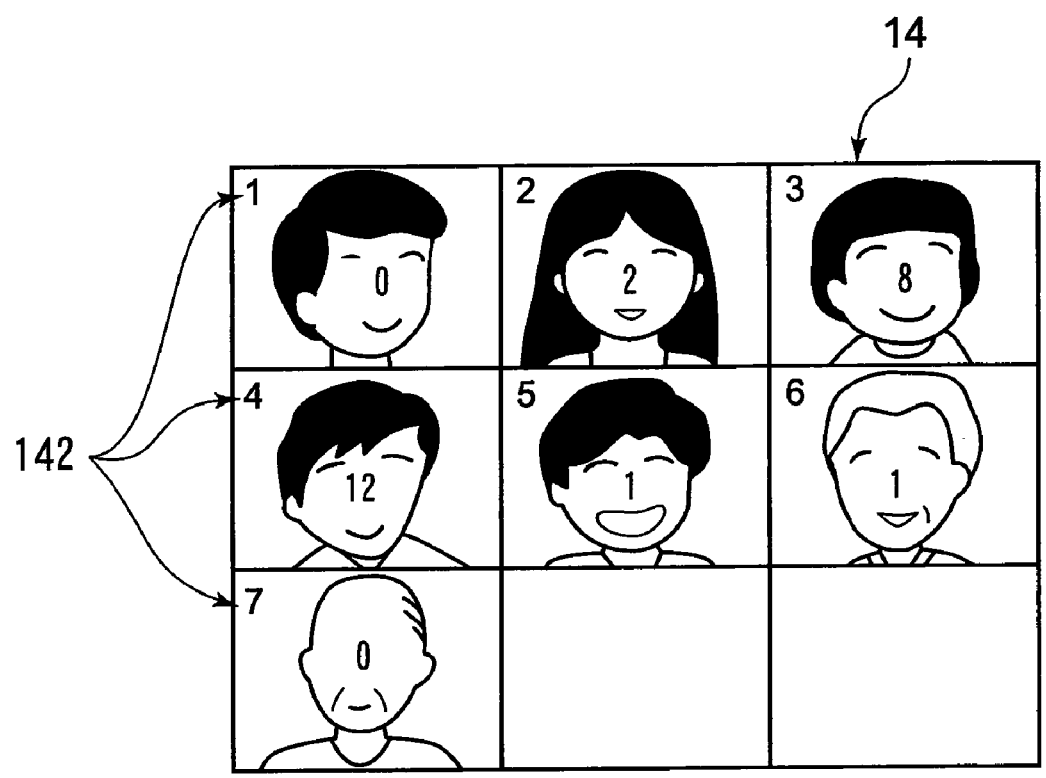
FIG. 9 is a display example in the second embodiment.

Next, the face image data 203 is read from each face registration file 20 stored in the flash memory 11, and a list of registration face images, which are face images based on the read face image data 203, is displayed (step S409). Therefore, on the display unit 14, the list of registration face images is displayed based on the face image data 203 recorded in each face registration file 20, as shown in FIG. 9.

The face registration file 20 contains, as described above, not only the user dictionary data 202 that is characteristic data of the face image, but also the face image data 203 as the management information. Accordingly, by effectively utilizing this face image data 203, it is possible to display the list of face images in the face registration files 20 stored in the flash memory 11.

The face registration file 20 also contains the user setting information 201 as the management information, and it is therefore possible to display the list of the registration face images in order of descending priority based on "Family Priority", which is of the user setting information 201 and is indicating the priority at the time of shooting. Furthermore, the order of priority 142 can be displayed for each registration face image.

Subsequently, a shot-image number display processing is executed (step S410). By this processing at step S410, a value of the counter C corresponding to each face image is displayed thereon in a superimposed manner, as shown in FIG. 9. Accordingly, every time an image containing the registration face image is shot, the number of shot images containing this registration face image is displayed for each registration face image on the display unit 14. This enables a shooting an image of a person to confirm the number of shot images of each registered person every time this person to shoot the image takes images of these registered persons. This therefore gives a strong recognition on the person shooting the images of the number of shot images of each registered person, and hence raises awareness of a person whose images have not been shot or whose shot images are less in number in subsequent shooting operations, so that it is possible to shoot images of registered persons in equal numbers, without omitting any person.

Furthermore, according to the second embodiment, each registration face image is arranged in order of descending priority, and the order of priority 142 is also displayed for each registration face image. Accordingly, by comparison of these registration face images between the arranged position thereof and the order of priority 142, and the number of shot images, it is possible to confirm at a glance as to whether the number of shot images of a high-priority person is larger than that of a low-priority person. Therefore, a person shooting images who has confirmed this consciously intends to shoot images so that the order of priority and the number of shot images are proportional, which makes it possible to shoot an appropriate number of images containing each registered person according to the order of priority.

That is, the face registration file 20 contains, as described above, not only the user dictionary data 202 that is the characteristic data of the face image, but also the "Family Priority" that is of the user setting information 201 and is indicating the order of priority at the time of shooting as the management information. Accordingly, by effectively utilizing this "Family Priority", it is possible to shoot an appropriate number of images containing each registered person according to the order of priority.

The flag F and counter C employed in each embodiment can be reset, for example, when the process in the shooting mode is started, and when the shooting in the shooting mode is terminated.

According to the foregoing embodiments, a file is generated for a face image of a person, but any object can be used in generating a file, without being limited to a face image.

All of other embodiments, examples, operational techniques and the like, which are made by those skilled in the art based on the above embodiment, are naturally incorporated in the scope of the present invention.

What is claimed is:

1. An imaging device having an imaging unit, the imaging device comprising:
    an image recording unit that records an image captured by the imaging unit to a memory for storing;
    a characteristic acquiring unit that specifies a partial image corresponding to a particular object from the image captured by the imaging unit for recording by the image recording unit to the memory, and performs an operation to acquire characteristic information indicating characteristics of the particular object from the specified partial image; and
    a determination unit that determines whether the characteristic information has been acquired by the characteristic acquiring unit;
    wherein:
    in response to the determination unit determining that the characteristic information has been acquired, the image recording unit associates the characteristic information acquired by the characteristic acquiring unit with the specified partial image captured by the imaging unit from which the characteristic information has been acquired, and records a file containing the associated characteristic information and specified partial image to the memory for storing;
    the image recording unit records the characteristic information acquired by the characteristic acquiring unit in association with the specified partial image for each of a plurality of objects; and
    the imaging device further comprises an object determining unit that determines that the captured object is included in a newly captured image captured by the imaging unit when characteristic information extracted from the newly captured image is consistent with the characteristic information recorded to the memory.

2. The imaging device according to claim 1, wherein the image recording unit adds information relevant to the image when recording.

3. The imaging device according to claim 1, wherein the memory comprises a removable storage medium.

4. The imaging device according to claim 1, further comprising an output unit that outputs the file stored in the memory to an external device.

5. The imaging device according to claim 1, further comprising:
    an input unit that receives input of a file that is of a same type as the file recorded by the image recording unit; and
    a storage control unit that causes the memory to store the file input to the input unit.

6. The imaging device according to claim 1, wherein the partial image specified by the characteristic acquiring unit comprises a face image corresponding to a face of a person from the image captured by the imaging unit, and
    wherein the characteristic acquiring unit acquires characteristic information showing characteristics of the person from the specified face image.

7. The imaging device according to claim 1, further comprising:
    a detector that detects a recording status of an image having the characteristic information that is contained in each file stored in the memory; and
    a display unit that displays a detection result of the detector.

8. The imaging device according to claim 7, wherein the display unit displays the detection result of the detector in a manner associated with the image contained in each file.

9. The imaging device according to claim 7, wherein:
    the detector detects whether an image having the characteristic information contained in each file is recorded, and
    the display unit displays the detection result of the detector as to whether the image having the characteristic information is recorded.

10. The imaging device according to claim 7, wherein:
    the detector detects a number of images having the characteristic information contained in each file in a manner associated with each file, and
    the display unit displays the number of images associated with each file that is detected by the detector.

11. A non-transitory computer-readable recording medium having a program recorded thereon for causing a computer provided in an imaging device having an imaging unit to function as units comprising:
   an image recording unit that records an image captured by the imaging unit to a memory for storing;
   a characteristic acquiring unit that specifies a partial image corresponding to a particular object from the image captured by the imaging unit, and performs an operation to acquire characteristic information indicating characteristics of the particular object from the specified partial image; and
   a determination unit that determines whether the characteristic information has been acquired by the characteristic acquiring unit;
   wherein:
   in response to the determination unit determining that the characteristic information has been acquired, the image recording unit associates the characteristic information acquired by the characteristic acquiring unit with the specified partial image captured by the imaging unit from which the characteristic information has been acquired, and records a file containing the associated characteristic information and specified partial image to the memory for storing;
   the image recording unit records the characteristic information acquired by the characteristic acquiring unit in association with the specified partial image for each of a plurality of objects; and
   the program causes the computer to further function as an object determining unit that determines that the captured object is included in a newly captured image captured by the imaging unit when characteristic information extracted from the newly captured image is consistent with the characteristic information recorded to the memory.

12. An imaging control method for an imaging device having an imaging unit, the method comprising:
   recording an image captured by the imaging unit to a memory for storing;
   specifying a partial image corresponding to a particular object from the image captured by the imaging unit for recording to the memory;
   acquiring characteristic information indicating characteristics of the particular object from the specified partial image;
   determining whether the characteristic information has been acquired; and
   in response to a determination that the characteristic information has been acquired, associating the acquired characteristic information with the specified partial image captured by the imaging unit from which the characteristic information has been acquired, and recording a file containing the associated characteristic information and specified partial image to the memory for storing;
   wherein the acquired characteristic information is recorded in association with the specified partial image for each of a plurality of objects; and
   wherein the method further comprises determining that the captured object is included in a newly captured image captured by the imaging unit when characteristic information extracted from the newly captured image is consistent with the characteristic information recorded to the memory.

13. The imaging device according to claim 1, further comprising:
   an image displaying unit that displays the images successively captured by the imaging unit without recording the successively captured images to a memory,
   wherein the characteristic acquiring unit acquires the characteristic information from the successively captured images displayed by the image displaying unit.

14. The imaging device according to claim 13, wherein:
   the image recording unit compresses the image captured by the imaging unit and records the compressed image to the memory in response to a user operation;
   the image displaying unit successively displays a pre-compressed image captured by the imaging unit independently of the user operation; and
   the characteristic acquiring unit acquires the characteristic information from the pre-compressed image successively displayed by the image displaying unit.

15. The imaging device according to claim 14, wherein the image recording unit generates a single file containing the characteristic information acquired by the characteristic acquiring unit and the image captured by the imaging unit from which the characteristic information has been acquired and records the generated single file to the memory in response to the user operation and the determination by the determination unit that the characteristic information has been acquired.

16. The imaging device according to claim 1, further comprising:
   a mode setting unit that enables selection of a face registration mode;
   wherein the image recording unit generates a single file containing the characteristic information acquired by the characteristic acquiring unit and the image captured by the imaging unit from which the characteristic information has been acquired and records the generated single file to the memory in response to the selection of the face registration mode by the mode setting unit and the determination by the determination unit that the characteristic information has been acquired.

17. The imaging device according to claim 16, wherein:
   the mode setting unit further enables selection of at least a shooting mode; and
   in response to the selection of the shooting mode by the mode setting unit, a detecting unit detects a registered individual from an image newly captured by the image capturing unit by using information in the single file recorded in the memory by the image recording unit.

18. The imaging device according to claim 16, wherein:
   the image displaying unit displays a guide frame that guides a shooting position of a face; and
   in response to the selection of the face registration mode by the mode setting unit, the image recording unit generates the single file containing the characteristic information acquired by the characteristic acquiring unit and an image located inside the guide frame in the image captured by the imaging unit, and records the generated single file to the memory.

19. The imaging device according to claim 2, wherein the partial image specified by the characteristic acquiring unit comprises a face image corresponding to a face of a person from the image captured by the imaging unit, and
   wherein the characteristic acquiring unit acquires characteristic information showing characteristics of the person from the specified face image.

20. The imaging device according to claim 3, wherein the partial image specified by the characteristic acquiring unit comprises a face image corresponding to a face of a person from the image captured by the imaging unit, and wherein the characteristic acquiring unit acquires characteristic information showing characteristics of the person from the specified face image.

21. The imaging device according to claim 4, wherein the partial image specified by the characteristic acquiring unit comprises a face image corresponding to a face of a person from the image captured by the imaging unit, and
wherein the characteristic acquiring unit acquires characteristic information showing characteristics of the person from the specified face image.

22. The imaging device according to claim 5, wherein the partial image specified by the characteristic acquiring unit comprises a face image corresponding to a face of a person from the image captured by the imaging unit, and
wherein the characteristic acquiring unit acquires characteristic information showing characteristics of the person from the specified face image.

23. An imaging device having an imaging unit, the imaging device comprising:
an image recording unit that records an image captured by the imaging unit to a memory for storing;
a characteristic acquiring unit that specifies a partial image corresponding to a particular object from the image captured by the imaging unit for recording by the image recording unit to the memory, and performs an operation to acquire characteristic information indicating characteristics of the particular object from the specified partial image; and
a determination unit that determines whether the characteristic information has been acquired by the characteristic acquiring unit;
wherein:
in response to the determination unit determining that the characteristic information has been acquired, the image recording unit associates the characteristic information acquired by the characteristic acquiring unit with the specified partial image captured by the imaging unit from which the characteristic information has been acquired, and records a file containing the associated characteristic information and specified partial image to the memory for storing;
the imaging device further comprises a detector that detects a recording status of an image having the characteristic information that is contained in each file stored in the memory, and a display unit that displays a detection result of the detector; and
the detector detects a number of images having the characteristic information contained in each file in a manner associated with each file, and the display unit displays the number of images associated with each file that is detected by the detector.

24. A non-transitory computer-readable recording medium having a program recorded thereon for causing a computer provided in an imaging device having an imaging unit to function as units comprising:
an image recording unit that records an image captured by the imaging unit to a memory for storing;
a characteristic acquiring unit that specifies a partial image corresponding to a particular object from the image captured by the imaging unit for recording by the image recording unit to the memory, and performs an operation to acquire characteristic information indicating characteristics of the particular object from the specified partial image; and
a determination unit that determines whether the characteristic information has been acquired by the characteristic acquiring unit;
wherein:
in response to the determination unit determining that the characteristic information has been acquired, the image recording unit associates the characteristic information acquired by the characteristic acquiring unit with the specified partial image captured by the imaging unit from which the characteristic information has been acquired, and records a file containing the associated characteristic information and specified partial image to the memory for storing;
the computer is further caused to function as a detection unit that detects a recording status of an image having the characteristic information that is contained in each file stored in the memory, and a display control unit that controls display of a detection result of the detection unit; and
the detection unit detects a number of images having the characteristic information contained in each file in a manner associated with each file, and the display control unit controls display of the number of images associated with each file that is detected by the detection unit.

25. An imaging control method for an imaging device comprising an imaging unit, the method comprising:
recording an image captured by the imaging unit to a memory for storing;
specifying a partial image corresponding to a particular object from the image captured by the imaging unit for recording to the memory;
acquiring characteristic information indicating characteristics of the particular object from the specified partial image;
determining whether the characteristic information has been acquired;
in response to a determination that the characteristic information has been acquired, associating the acquired characteristic information with the specified partial image captured by the imaging unit from which the characteristic information has been acquired, and recording a file containing the associated characteristic information and specified partial image to the memory for storing; and
detecting a recording status of an image having the characteristic information that is contained in each file stored in the memory, and displaying of a result of the detecting;
wherein the detecting detects a number of images having the characteristic information contained in each file in a manner associated with each file, and the displaying displays the detected number of images associated with each file.

* * * * *